US012269292B2

(12) United States Patent
Tominaga et al.

(10) Patent No.: US 12,269,292 B2
(45) Date of Patent: Apr. 8, 2025

(54) IN-WHEEL MOTOR UNIT WITH SPEED REDUCER AND ELECTROMAGNETIC BRAKE

(71) Applicant: TOYOTA JIDOSHA KABUSHIKI KAISHA, Toyota (JP)

(72) Inventors: Satoshi Tominaga, Susono (JP); Tadashi Fujiyoshi, Anjo (JP); Hirotaka Sunada, Nagoya (JP); Katsuhiko Tatebe, Seto (JP); Tetsuyoshi Fukaya, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 18/072,067

(22) Filed: Nov. 30, 2022

(65) Prior Publication Data

US 2023/0234396 A1  Jul. 27, 2023

(30) Foreign Application Priority Data

Jan. 25, 2022 (JP) ................. 2022-009658

(51) Int. Cl.
*B60B 27/00* (2006.01)
*B60B 27/04* (2006.01)
*B60K 7/00* (2006.01)
*H02K 7/00* (2006.01)
(Continued)

(52) U.S. Cl.
CPC ...... *B60B 27/0021* (2013.01); *B60B 27/0052* (2013.01); *B60B 27/04* (2013.01); *B60K 7/0007* (2013.01); *H02K 7/006* (2013.01); *H02K 7/102* (2013.01); *H02K 7/116* (2013.01)

(58) Field of Classification Search
CPC ........ H02K 7/006; H02K 7/102; H02K 7/116; H02K 21/22; H02K 7/106; H02K 5/04; B60K 7/007; B60B 27/0021; B60B 27/0052; B60B 27/04; Y02T 10/64
See application file for complete search history.

(56) References Cited

U.S. PATENT DOCUMENTS

2019/0106096 A1   4/2019  Tang et al.

FOREIGN PATENT DOCUMENTS

| CN | 105691184 A | * | 6/2016 | ............... B60K 7/00 |
| CN | 113602078 A | * | 11/2021 | |
| JP | H05-197427 A | | 8/1993 | |

(Continued)

OTHER PUBLICATIONS

CN113602078A English translation (Year: 2024).*
CN105691184A English translation (Year: 2024).*
WO2019153446A1 English translation (Year: 2024).*

*Primary Examiner* — Christopher M Koehler
*Assistant Examiner* — Viswanathan Subramanian
(74) *Attorney, Agent, or Firm* — Dinsmore & Shohl LLP

(57) ABSTRACT

An in-wheel motor unit provided in a wheel of a wheel unit, includes: a motor having a rotor disposed on a radially outer side of a stator; a brake disposed on an inner side of the motor; and a housing that accommodates the motor and the brake. Further, the housing has a cylindrical partition that radially partitions a space for accommodating the motor and a space for accommodating the brake, the stator is fixed to an outer peripheral surface of the partition, and the brake is disposed on an inner peripheral side of the partition, and a fixing portion included in the brake is fixed to the housing.

2 Claims, 11 Drawing Sheets

(51) Int. Cl.
*H02K 7/102* (2006.01)
*H02K 7/116* (2006.01)

(56) References Cited

FOREIGN PATENT DOCUMENTS

| | | | |
|---|---|---|---|
| JP | H05-278476 A | 10/1993 | |
| JP | 2006-001373 A | 1/2006 | |
| JP | 2007-253687 A | 10/2007 | |
| JP | 2011-183985 A | 9/2011 | |
| WO | WO-2019153446 A1 * | 8/2019 | ............. H02K 21/22 |

* cited by examiner

IN-WHEEL MOTOR UNIT WITH SPEED REDUCER AND ELECTROMAGNETIC BRAKE

CROSS-REFERENCE TO RELATED APPLICATION(S)

The present application claims priority to and incorporates by reference the entire contents of Japanese Patent Application No. 2022-009658 filed in Japan on Jan. 25, 2022.

BACKGROUND

The present disclosure relates to an in-wheel motor unit.

Japanese Laid-open Patent Publication No. H05-278476 discloses an in-wheel motor unit including a brake and a motor. A configuration described in Japanese Laid-open Patent Publication No. H05-278476 includes the motor in which a rotor is disposed on a radially inner side of a stator, and a drum brake having a structure in which a drum is formed in a part of the rotor and the rotor is pressed from an inside by a lining.

SUMMARY

There is a need for providing an in-wheel motor unit capable of avoiding an increase in size while securing the flexibility in mounting the unit including a motor and a brake.

According to an embodiment, an in-wheel motor unit provided in a wheel of a wheel unit, includes: a motor having a rotor disposed on a radially outer side of a stator; a brake disposed on an inner side of the motor; and a housing that accommodates the motor and the brake. Further, the housing has a cylindrical partition that radially partitions a space for accommodating the motor and a space for accommodating the brake, the stator is fixed to an outer peripheral surface of the partition, and the brake is disposed on an inner peripheral side of the partition, and a fixing portion included in the brake is fixed to the housing.

DETAILED DESCRIPTION

In the configuration described in Japanese Laid-open Patent Publication No. H05-278476, an axial dimension of the unit is reduced by disposing the drum brake on an inner side of the rotor in order to improve mountability. However, since the lining needs to be disposed at a position where the lining can come into contact with an inner peripheral surface of the rotor, there is room for improvement from a viewpoint of mounting flexibility.

Hereinafter, an in-wheel motor unit according to embodiments of the present disclosure will be specifically described with reference to the drawings. Note that the present disclosure is not limited to the embodiments described below.

First Embodiment

Figure 1:
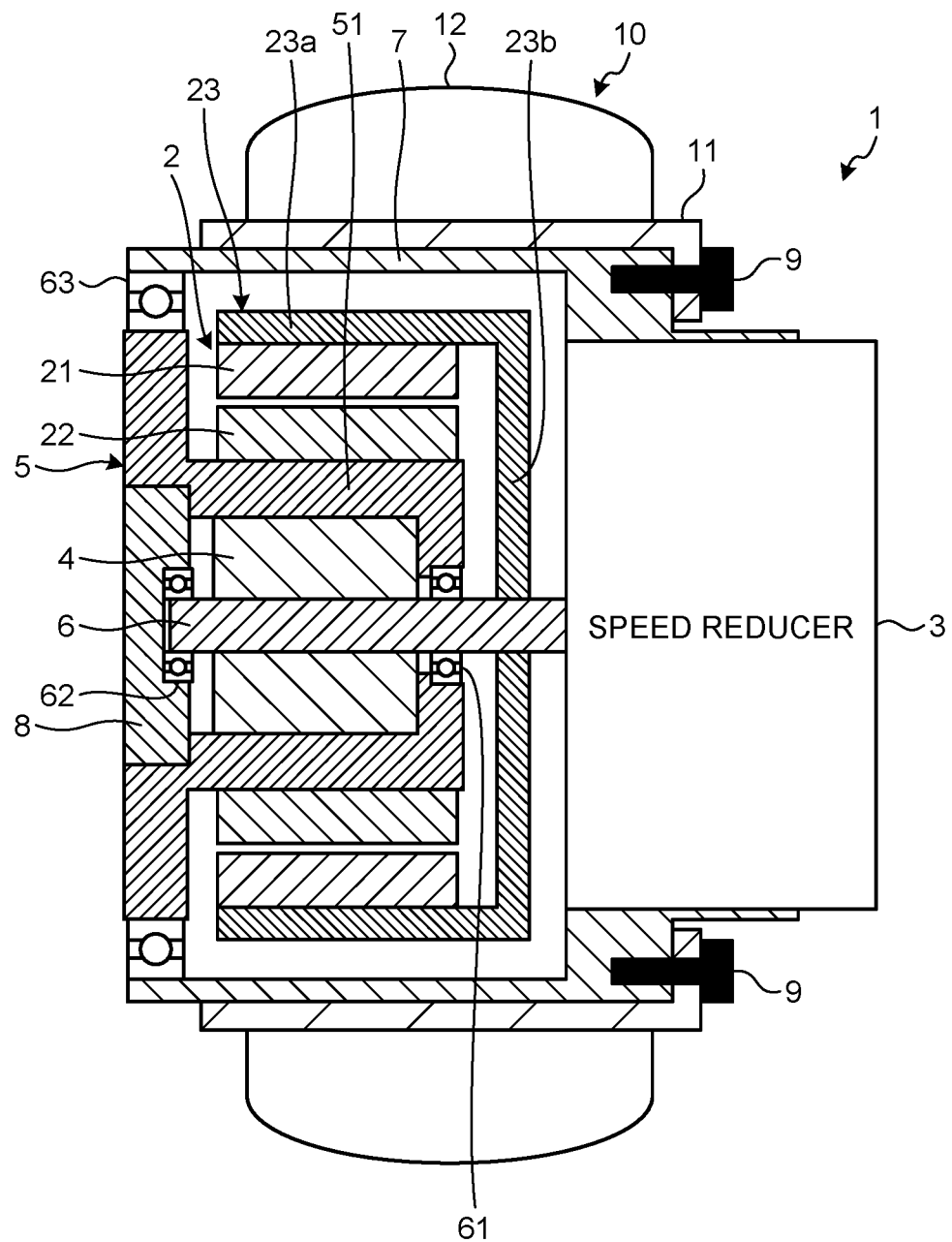
FIG. 1 is a diagram schematically illustrating an in-wheel motor unit according to a first embodiment.

FIG. 1 is a diagram schematically illustrating an in-wheel motor unit according to a first embodiment. An in-wheel motor unit 1 is a unit capable of driving a wheel unit 10 and also braking the wheel unit 10. The wheel unit 10 is a drive wheel including a wheel 11 and a tire 12, and is provided on both left and right sides of a vehicle. The in-wheel motor unit 1 is provided inside the wheel 11. Note that FIG. 1 illustrates a right wheel unit of the wheel unit 10 provided on each of the left and right sides when viewed from a back side of the vehicle. A direction parallel to a rotation center axis of the wheel unit 10 is referred to as an axial direction.

The in-wheel motor unit 1 includes a motor 2, a speed reducer 3, a brake 4, a housing 5, a rotating shaft 6, and an output member 7.

The motor 2 is an in-wheel motor that drives the wheel unit 10. The motor 2 is a three-phase motor, and is electrically connected to a power supply device mounted on the vehicle. During power running, the motor 2 generates a power running torque by electric power supplied from the power supply device to drive the wheel unit 10. During regeneration, the motor 2 is rotated by a rotational force of the wheel unit 10 to generate electric power, and the generated electric power is supplied to the power supply device.

The motor 2 is an outer rotor type motor in which a rotor 21 is disposed radially outside a stator 22.

The rotor 21 is attached to a rotating member 23 and rotates integrally with the rotating member 23. The rotating member 23 has a cup shape, and includes a cylindrical portion 23a and a disk portion 23b.

The cylindrical portion 23a extends in the axial direction, and the rotor 21 is fixed to an inner peripheral surface of the cylindrical portion 23a. The disk portion 23b extends radially inward from one axial end of the cylindrical portion 23a, and an inner periphery of the disk portion 23b is connected to the rotating shaft 6. For example, the inner periphery of the disk portion 23b is spline-fitted to an outer periphery of the rotating shaft 6. The rotating member 23 rotates integrally with the rotating shaft 6.

The rotating shaft 6 is connected to the speed reducer 3. The rotor 21 is connected to the speed reducer 3 via the rotating shaft 6. Therefore, the rotating shaft 6 functions as an input shaft of the speed reducer 3 when power of the motor 2 is transmitted to the wheel unit 10. Since the motor 2 is connected to the wheel unit 10 via the speed reducer 3 so as to be able to transmit power, the power output from the motor 2 is transmitted to the wheel unit 10 via the speed reducer 3.

The stator 22 includes a stator core and a stator coil wound around the stator core. The stator coil is electrically connected to the power supply device via motor wiring. The stator 22 is fixed to the housing 5.

The housing 5 is a non-rotating member that houses the motor 2 and the brake 4. The housing 5 has a cylindrical partition 51 that radially partitions a space for accommodating the motor 2 (motor chamber) and a space for accommodating the brake 4 (brake chamber).

The partition 51 is a cylindrical portion extending in the axial direction. In the housing 5, the motor 2 is disposed on an outer peripheral side of the partition 51, and the brake 4 is disposed on an inner peripheral side of the partition 51. On the outer peripheral side of the partition 51, the stator 22 is fixed to an outer peripheral surface of the partition 51. On the inner peripheral side of the partition 51, a fixing portion included in the brake 4 is fixed to the housing 5. The fixing portion included in the brake 4 is a non-rotating member among the members of the brake 4. As described above, in the in-wheel motor unit 1, one housing 5 is shared as a housing for accommodating the motor 2 and a housing for accommodating the brake 4.

A cover 8 is attached to the housing 5 so as to partition the space for accommodating the brake 4 (brake chamber) in the axial direction. The cover 8 is fixed to the housing 5 so as to close an opening on one side (opening on an inner side of the vehicle) in the axial direction of the partition 51. For example, the cover 8 is fixed to the housing 5 by bolt fastening.

The brake 4 is a device that applies a braking force to the wheel unit 10. The brake 4 is fixed to the housing 5 in a state disposed inside the motor 2. In the in-wheel motor unit 1, the output member 7, the rotor 21, the stator 22, the housing 5, the brake 4, and the rotating shaft 6 are arranged in this order from the radially outer side to the radially inner side of the wheel 11. The rotating shaft 6 is disposed on the rotation center axis of the wheel unit 10. The rotating shaft 6 is rotatably supported by bearings 61 and 62 with respect to the housing 5 and the cover 8. The bearing 61 is a rolling bearing whose outer ring is attached to the housing 5 and inner ring is attached to the rotating shaft 6. The bearing 62 is a rolling bearing whose outer ring is attached to the cover 8 and inner ring is attached to the rotating shaft 6.

The brake 4 is a friction engagement device that selectively fixes the rotating shaft 6 to the housing 5. In the in-wheel motor unit 1, since the rotating shaft 6 is provided in front of the speed reducer 3 (upstream side of the speed reducer 3 in a power transmission path), the brake 4 applies the braking force to the wheel unit 10 via the speed reducer 3 by braking the rotating shaft 6. Therefore, a braking torque generated by the brake 4 is amplified by the speed reducer 3 and transmitted to the wheel unit 10. This amplifying action is the same at the time of power running or regeneration of the motor 2. During the power running, the power running torque generated by the motor 2 is transmitted to the wheel unit 10 amplified by the speed reducer 3. During the regeneration, a regenerative torque generated by the motor 2 is amplified by the speed reducer 3 and transmitted to the wheel unit 10. The motor 2 functions as a regenerative brake and can apply the braking force to the wheel unit 10.

The speed reducer 3 is a power transmission mechanism provided in the power transmission path between the motor 2 and the wheel unit 10. The speed reducer 3 is disposed side by side with the motor 2 in the axial direction, and at least a part of the speed reducer 3 is disposed inside the wheel 11. The speed reducer 3 and the brake 4 are disposed at positions overlapping each other in the axial direction. Regarding the positional relationship between the motor 2 and the speed reducer 3, the motor 2 is disposed relatively inner side of the vehicle, and the speed reducer 3 is disposed relatively outer side of the vehicle.

When transmitting the power of the motor 2 to the wheel unit 10, the speed reducer 3 decelerates the rotation of the motor 2 and outputs the decelerated rotation to the output member 7. The output member 7 is connected to a rotating member (output element) on an output side of the speed reducer 3 and functions as an output member of the speed reducer 3. The output member 7 is connected so as to rotate integrally with the wheel 11. The output member 7 and the wheel 11 are fastened and integrated by a plurality of bolts 9. Further, the output member 7 has a hollow shaft and is disposed inside a rim of the wheel 11. The output member 7 is disposed along the rotation center axis of the wheel unit 10 and is rotatably supported by a bearing 63 with respect to the housing 5. The bearing 63 is a rolling bearing whose outer ring is attached to the output member 7 and inner ring is attached to the housing 5. The motor 2, the speed reducer 3, and the brake 4 are disposed inside the output member 7.

Now, a detailed structure of the in-wheel motor unit 1 will be described with reference to FIGS. 2 and 3. In the first embodiment, the speed reducer 3 is configured with a combined planetary gear mechanism, and the brake 4 is configured with a disc brake.

Figure 2:
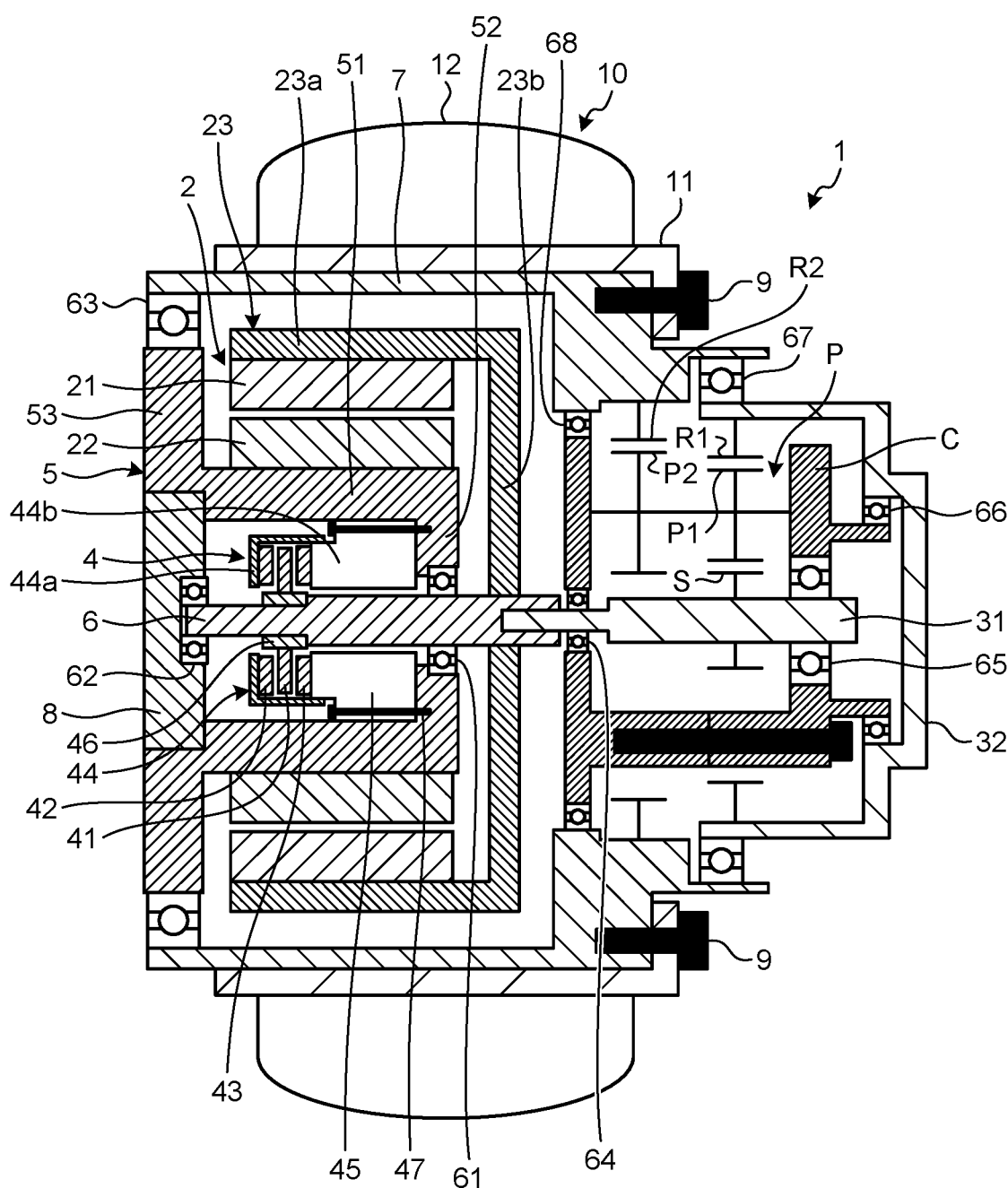
FIG. 2 is a diagram illustrating a structure of the in-wheel motor unit according to the first embodiment.

As illustrated in FIG. 2, the speed reducer 3 includes a sun gear S, a carrier C, a stepped pinion gear P, a fixed ring gear R1, and an output ring gear R2. In this combined planetary gear mechanism, when power is transmitted from the rotating shaft 6 to the output member 7, the sun gear S serves as an input element, the fixed ring gear R1 serves as a fixed element, and the output ring gear R2 serves as an output element.

The sun gear S is connected so as to rotate integrally with a sun gear shaft 31. The sun gear shaft 31 is a rotating shaft disposed on the same axis as the rotating shaft 6, and is connected to the rotating shaft 6 so as to rotate integrally therewith. For example, the rotating shaft 6 and the sun gear shaft 31 are spline-fitted. The sun gear shaft 31 is supported by a bearing 64 and a bearing 65 so as to be relatively rotatable with respect to the carrier C.

The carrier C rotatably and revolvably supports the stepped pinion gear P. The carrier C is rotatably supported by a bearing 66 with respect to a fixing member 32. The fixing member 32 is a non-rotating member that functions as a housing for housing the speed reducer 3. As illustrated in FIG. 2, the fixing member 32 is disposed on an outer side of the vehicle than the wheel 11 in the axial direction. Further, the fixing member 32 is coupled to the housing 5 via a connection member (not illustrated) so as to be integrated with the housing 5. For example, the connection member extends from the fixing member 32 so as to cover an upper side of the wheel unit 10 and is connected to the housing 5.

The stepped pinion gear P includes a first pinion gear P1 engaged with the sun gear S and the fixed ring gear R1, and a second pinion gear P2 engaged with the output ring gear R2. The first pinion gear P1 is a gear having smaller diameter than the second pinion gear P2, and rotates integrally with the second pinion gear P2.

The fixed ring gear R1 is fixed to the fixing member 32 that is a non-rotating member. As illustrated in FIG. 2, the fixed ring gear R1 is attached to an inner periphery of the cylindrical portion of the fixing member 32.

The output ring gear R2 is connected so as to rotate integrally with the output member 7. As illustrated in FIG. 2, the output ring gear R2 is attached to an inner periphery of the output member 7. The output member 7 is rotatably supported by a bearing 67 with respect to the fixing member 32, and is supported by a bearing 68 so as to be relatively rotatable with respect to the carrier C.

Figure 3:
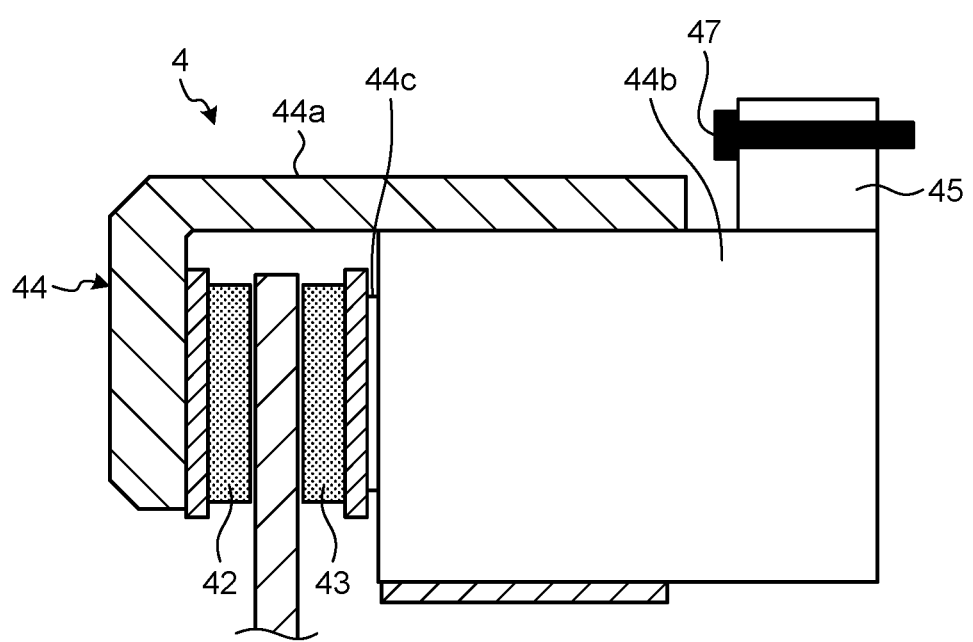
FIG. 3 is a diagram illustrating a structure of a disc brake according to the first embodiment.

As illustrated in FIGS. 2 and 3, the brake 4 includes a rotary disk 41, an inner pad 42, an outer pad 43, a pressing device 44, and a support 45.

The rotary disk 41 is connected to the rotating shaft 6 via a hub 46. The rotary disk 41 rotates integrally with the hub 46 and the rotating shaft 6. The brake 4 can suppress the rotation of the wheel unit 10 by braking the rotary disk 41.

The inner pad 42 and the outer pad 43 are brake pads disposed on both sides of the rotary disk 41. The inner pad 42 is disposed on an inner side of the vehicle than the rotary disk 41, and the outer pad 43 is disposed on an outer side of the vehicle than the rotary disk 41.

The pressing device 44 is a device that sandwiches the rotary disk 41 from both sides by the inner pad 42 and the outer pad 43. The pressing device 44 includes a caliper 44a and a cylinder 44b.

The caliper 44a supports the inner pad 42 and is movable in the axial direction. The cylinder 44b is an actuator that operates the brake 4. In the cylinder 44b, a piston 44c is accommodated in a cylinder formed inside the cylinder 44b. The piston 44c moves in the axial direction by force generated by the actuator, and the outer pad 43 is pressed toward the rotary disk 41. Further, after the outer pad 43 is pressed toward the rotary disk 41, the caliper 44a moves in the axial direction, and the inner pad 42 is pressed toward the rotary disk 41. As a result, the rotary disk 41 can be sandwiched between the inner pad 42 and the outer pad 43 from both sides.

The support 45 is a member that holds the cylinder 44b of the pressing device 44. The support 45 is provided with a bolt hole through which a bolt 47 is inserted. The support 45 is located on the outer peripheral side of the rotating shaft 6, is formed in a shape having a predetermined length in a circumferential direction of the rotating shaft 6, and is fixed to the housing 5 by a plurality of bolts 47.

The housing 5 includes an inner peripheral disk portion 52 extending radially inward from one axial end of the partition 51 and an outer peripheral disk portion 53 extending radially outward from the other axial end of the partition 51.

The disk portion 52 on the inner peripheral side extends along the radial direction inside the motor 2. The support 45 is fastened to the disk portion 52 with the bolt. The bolt 47 is screwed into the disk portion 52 in a state of being inserted into the bolt hole of the support 45. The bearing 61 is attached to the inner periphery of the disk portion 52.

The disk portion 53 on the outer peripheral side extends along the radial direction at a position axially facing the motor 2. As illustrated in FIG. 2, the disk portion 53 extends along the radial direction outside the cover 8 in the radial direction. The bearing 63 is attached to an outer periphery of the disk portion 53. The bearing 63 and the cover 8 are disposed at positions overlapping each other in the axial direction.

As described above, according to the first embodiment, the axial dimension of the unit can be reduced by disposing the brake 4 on the radially inner side of the stator 22 in the in-wheel motor unit 1 including the motor 2 in which the rotor 21 is disposed on the radially outer side of the stator 22. In addition, since the housing 5 that fixes the stator 22 and the housing 5 that fixes the fixing portion of the brake 4 can be shared, the number of housings can be reduced to one. As a result, the mounting flexibility is increased, and the entire unit is also downsized.

When the brake 4 is disposed on the upstream side of the speed reducer 3, the braking torque is amplified by the speed reducer 3 and transmitted to the wheel unit 10. Therefore, the torque required by the brake 4 can be reduced. As a result, the radial dimension of the brake 4 can be reduced, and thus the brake 4 can be downsized. As a result, the entire unit can be downsized. In addition, since a ready-made brake can be used as the brake 4, versatility is enhanced, and cost can also be reduced.

The first embodiment refers to an example in which the brake 4 is configured with the disc brake, but the present disclosure is not limited thereto. For example, the brake 4 may be configured with a drum brake. More specifically, the brake 4 may be any friction engagement device that switches between an engaged state in which the rotating shaft 6 is non-rotatably fixed and a disengaged state in which the rotating shaft 6 is rotatably released.

The actuator of the brake 4 may be configured with either a hydraulic actuator or an electric actuator. For example, when the actuator of the brake 4 is the hydraulic actuator, a hydraulic pressure is supplied from a hydraulic supply source mounted on the vehicle to the hydraulic actuator to operate the brake 4. When the actuator of the brake 4 is the electric actuator, electric power is supplied from the power supply device mounted on the vehicle to the electric actuator to operate the brake 4.

The first embodiment refers to the configuration including the speed reducer 3, but the present disclosure is not limited thereto. In other words, the in-wheel motor unit 1 may not be provided with the speed reducer 3. In this case, the motor 2 is connected to the wheel unit 10 so as to be able to transmit power without via the speed reducer 3. Similarly, the brake 4 is connected so as to apply the braking force to the wheel unit 10 without via the speed reducer 3.

Figure 4:
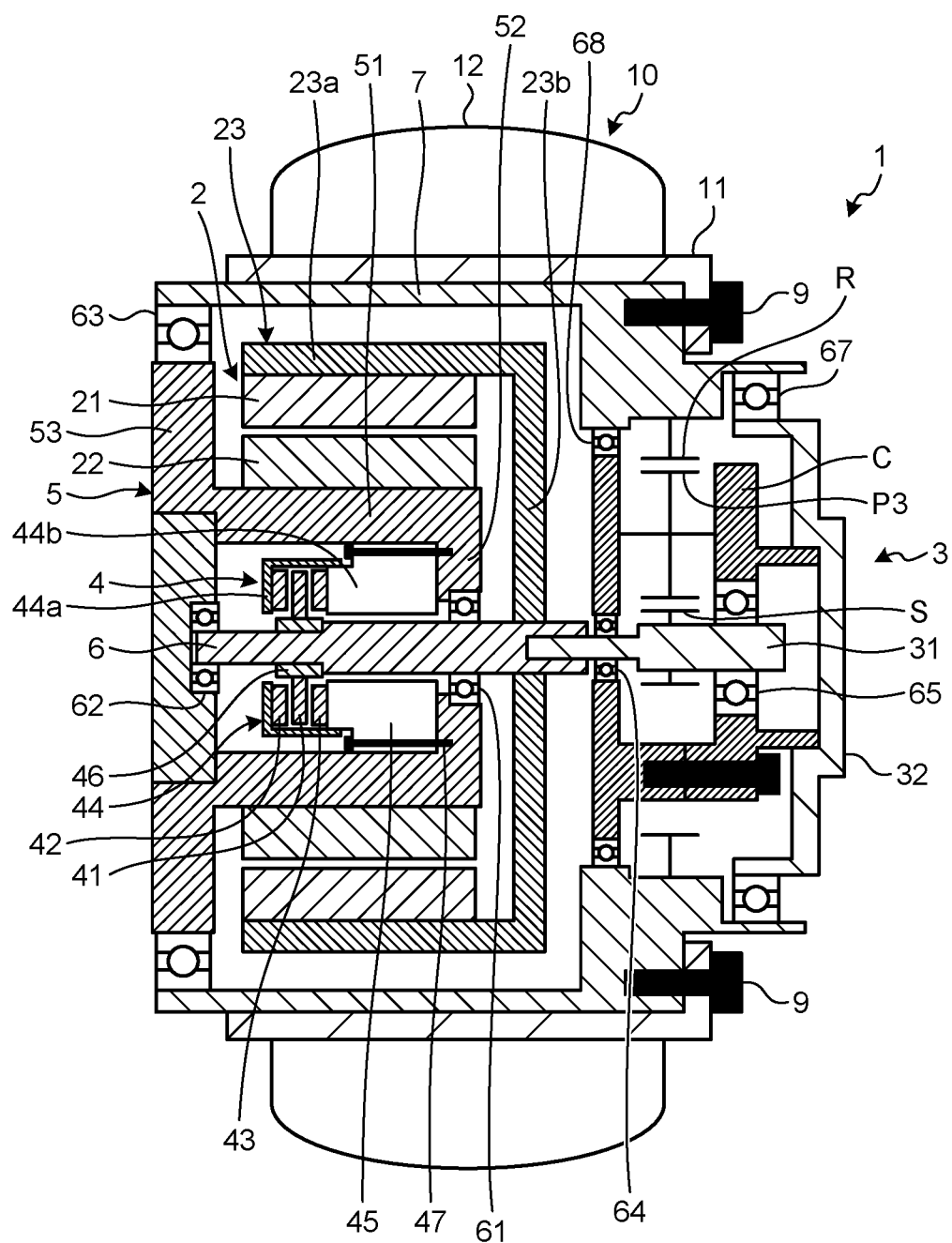
FIG. 4 is a diagram illustrating a modification of a speed reducer according to the first embodiment.

Further, the first embodiment refers to an example in which the speed reducer 3 is configured with the combined planetary gear mechanism having the stepped pinion gear P, but the present disclosure is not limited thereto. For example, as illustrated in FIG. 4, the speed reducer 3 can be configured with a planetary gear mechanism having a pinion gear P3 that engages with the sun gear S and the ring gear R. This speed reducer 3 includes the sun gear S, the ring gear R, and the carrier C that rotatably and revolvably holds the pinion gear P3 engaged with the sun gear S and the ring gear R. The carrier C is attached to the fixing member 32. The ring gear R is connected so as to rotate integrally with the output member 7. In this planetary gear mechanism, when power is transmitted from the rotating shaft 6 to the output member 7, the sun gear S serves as the input element, the carrier C serves as the fixed element, and the ring gear R serves as the output element.

Second Embodiment

Figure 5:
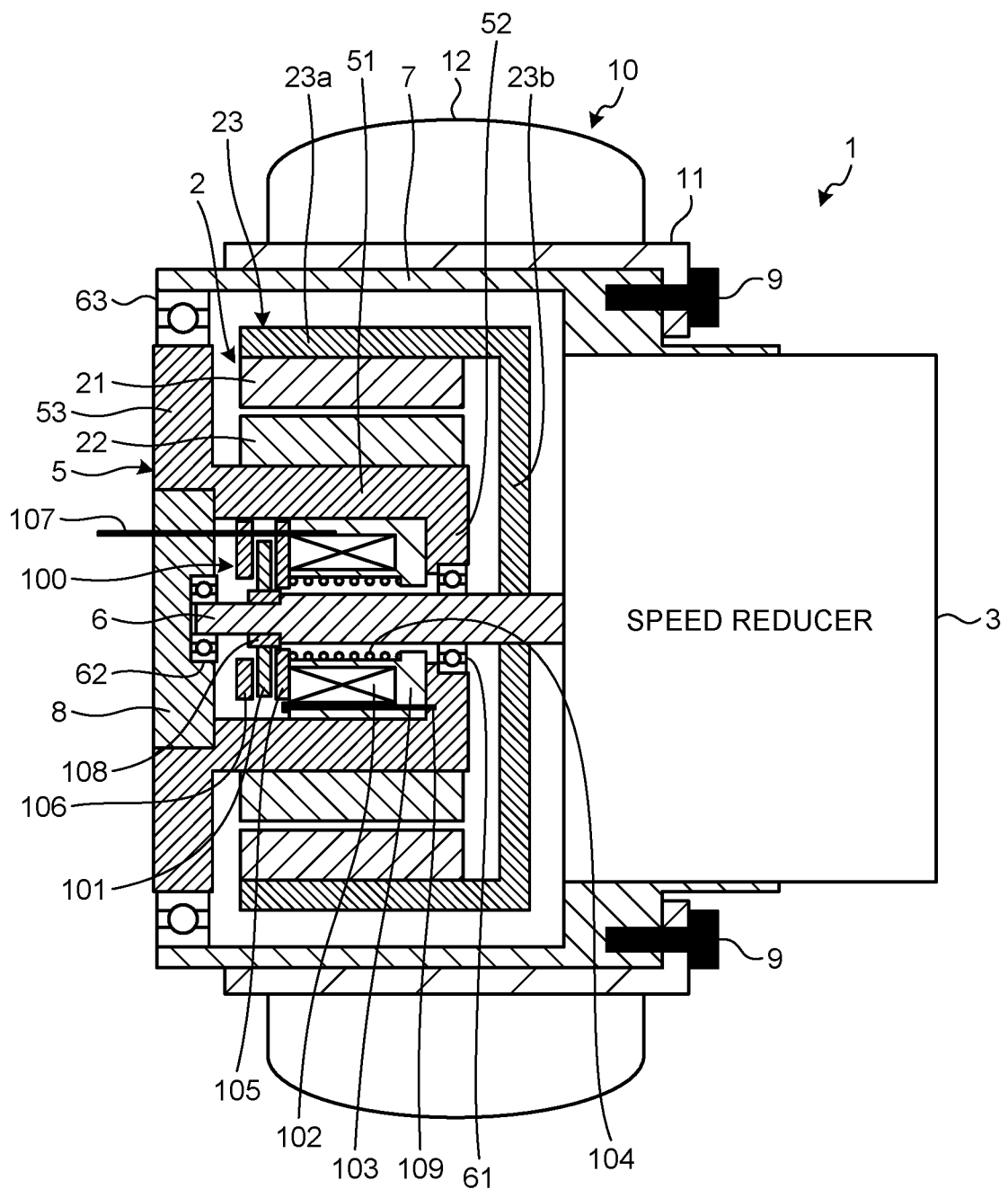
FIG. 5 is a diagram schematically illustrating an in-wheel motor unit according to a second embodiment.

FIG. 5 is a diagram schematically illustrating an in-wheel motor unit according to a second embodiment. In the second embodiment, unlike the first embodiment, the brake is configured with an electromagnetic brake 100. In the description of the second embodiment, components same as those of the first embodiment will not be described, and the same reference signs thereof will be given.

The in-wheel motor unit 1 according to the second embodiment includes, as a brake, an electromagnetic brake 100 fixed to the housing 5 in a state of being arranged inside the motor 2.

Figure 6:
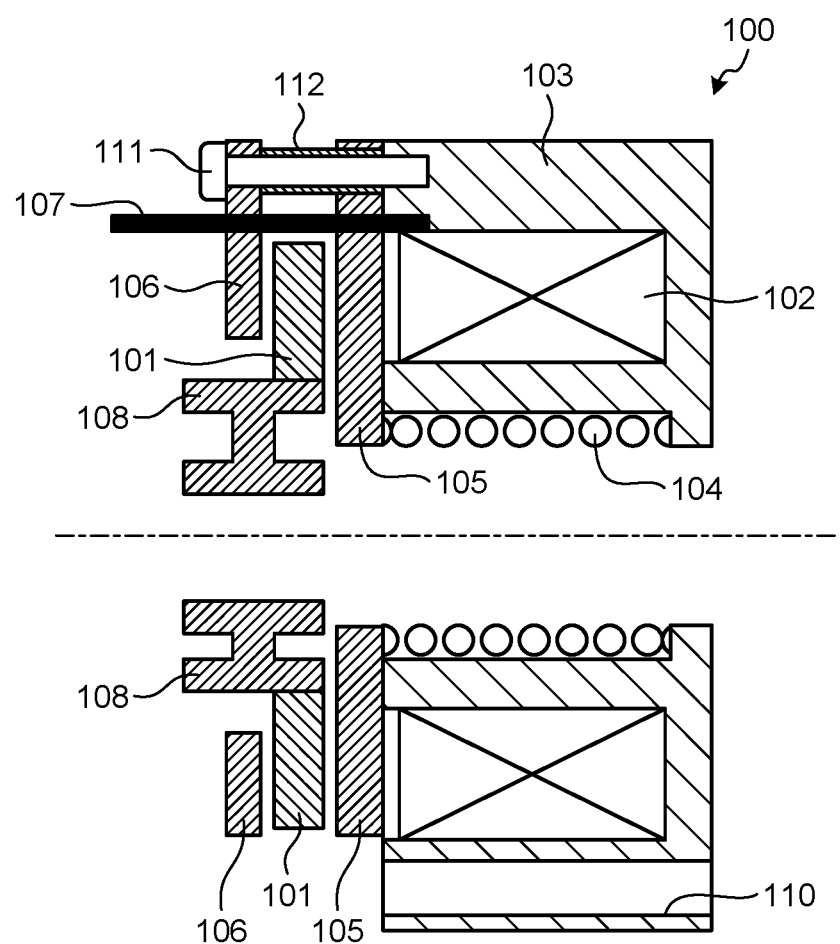
FIG. 6 is a diagram illustrating a structure of an electromagnetic brake according to the second embodiment.

The electromagnetic brake 100 is a non-excited operation type electromagnetic brake. The electromagnetic brake 100 of the non-excited operation type is in an operation state of braking the rotating shaft 6 in a state of not being energized, and is in a release state of rotatably releasing the rotating shaft 6 using a magnetic attraction force generated by being energized. The electromagnetic brake 100 is a normally-closed brake. As illustrated in FIGS. 5 and 6, the electromagnetic brake 100 includes a rotary disk 101, an electromagnetic coil 102, a yoke 103, a spring 104, an armature 105, a fixing plate 106, and a brake wiring 107.

The rotary disk 101 is connected so as to rotate integrally with the rotating shaft 6. The rotary disk 101 is connected to the rotating shaft 6 via a hub 108. The rotary disk 101, the hub 108, and the rotating shaft 6 rotate together.

The electromagnetic coil 102 is a coil that excites when energized. The electromagnetic coil 102 is electrically connected to a power supply device via the brake wiring 107. This power supply device is a power supply device common to the motor 2.

The yoke 103 is a member that holds the electromagnetic coil 102. The yoke 103 has a U-shaped cross section and is formed in an annular shape as a whole. As illustrated in FIG. 6, the yoke 103 is provided with a bolt hole 110 through which a bolt 109 is inserted. The yoke 103 is fixed to the housing 5 with the bolt 109 in a state that the electromagnetic coil 102 is accommodated in a U-shaped portion.

The spring 104 is interposed between the yoke 103 and the armature 105 to apply a biasing force to the armature 105. This biasing force is a force in an engagement direction. A movement of the spring 104 in the axial direction is restricted by an inner peripheral portion of the yoke 103.

The armature 105 is a disk-shaped plate member and is disposed between the rotary disk 101 and the electromagnetic coil 102. One surface of the armature 105 faces the electromagnetic coil 102 and the yoke 103 in the axial direction, and the other surface of the armature 105 faces the rotary disk 101 in the axial direction. A force by the spring 104 acts on the armature 105 to press the armature toward the rotary disk 101.

For example, when the electromagnetic coil 102 is energized, the armature 105 is attracted toward the electromagnetic coil 102, against the biasing force of the spring 104, by the magnetic attraction force generated by energization, and the armature 105 moves in the axial direction. When the electromagnetic coil 102 is not energized, no magnetic attractive force is generated. Therefore, the armature 105 is pressed, toward the rotary disk 101, in the engagement direction by the biasing force of the spring 104. In this non-excited state, the rotary disk 101 is sandwiched between the armature 105 and the fixing plate 106 by the biasing force of the spring 104, and the electromagnetic brake 100 is activated.

The fixing plate 106 is an annular plate member fixed to the yoke 103, and functions as a brake plate that brakes the rotary disk 101. As illustrated in FIG. 6, the fixing plate 106 is fixed to the yoke 103 by a screw 111 and a collar 112. The screw 111 is screwed into the yoke 103 while being inserted into the collar 112. The collar 112 regulates an axial movement of the fixing plate 106 and supports the armature 105. The armature 105 is unrotatably fixed by the screw 111 while being supported by the collar 112 so as to be relatively movable in the axial direction with respect to the yoke 103.

The fixing plate 106 is brought into a state that the fixing plate 106 cannot move in the axial direction by the collar 112, and is unrotatably fixed by the screw 111.

The brake wiring 107 extends outside the cover 8 in a state of being connected to the electromagnetic coil 102. The brake wiring 107 is led out from the inside of the brake chamber partitioned by the housing 5 and the cover 8 to the outside of the brake chamber at a position above the rotation center of the rotating shaft 6.

Figure 9:
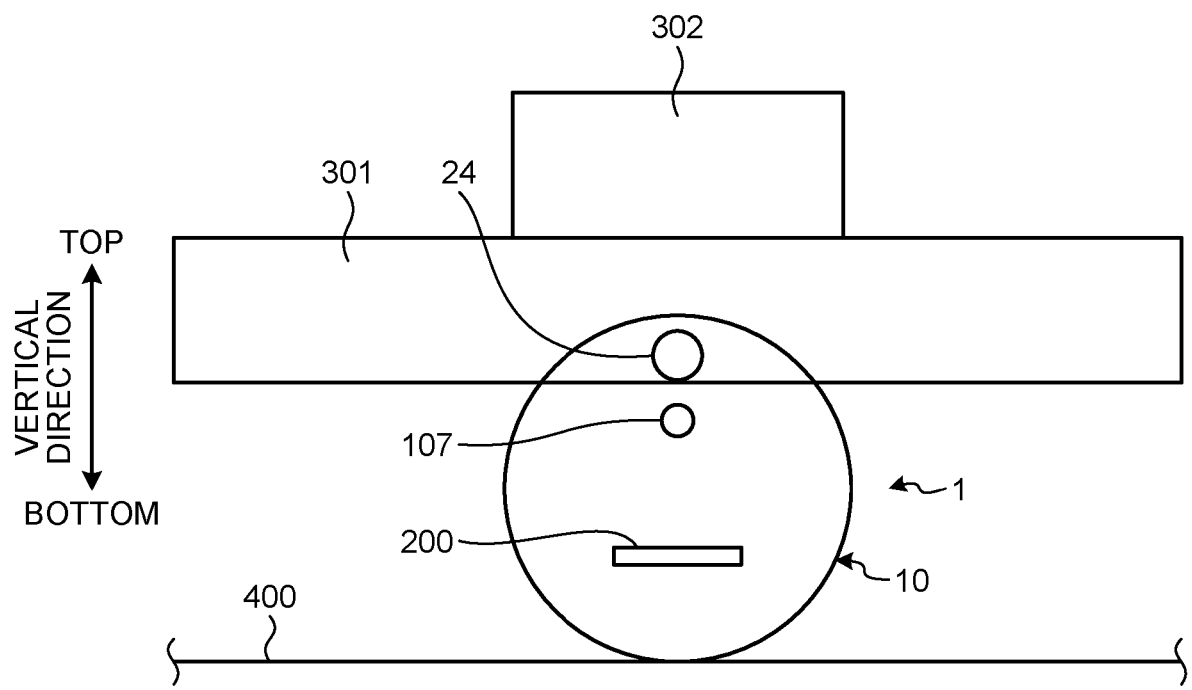
FIG. 9 is a diagram schematically illustrating a vehicle equipped with the in-wheel motor unit viewed from an outside of the vehicle according to the third embodiment.

In the in-wheel motor unit 1, the motor 2 and the electromagnetic brake 100 are controlled by a common controller 302 (illustrated in FIG. 9). The controller 302 can control the motor 2 and the electromagnetic brake 100 by a common voltage command.

Figure 7:
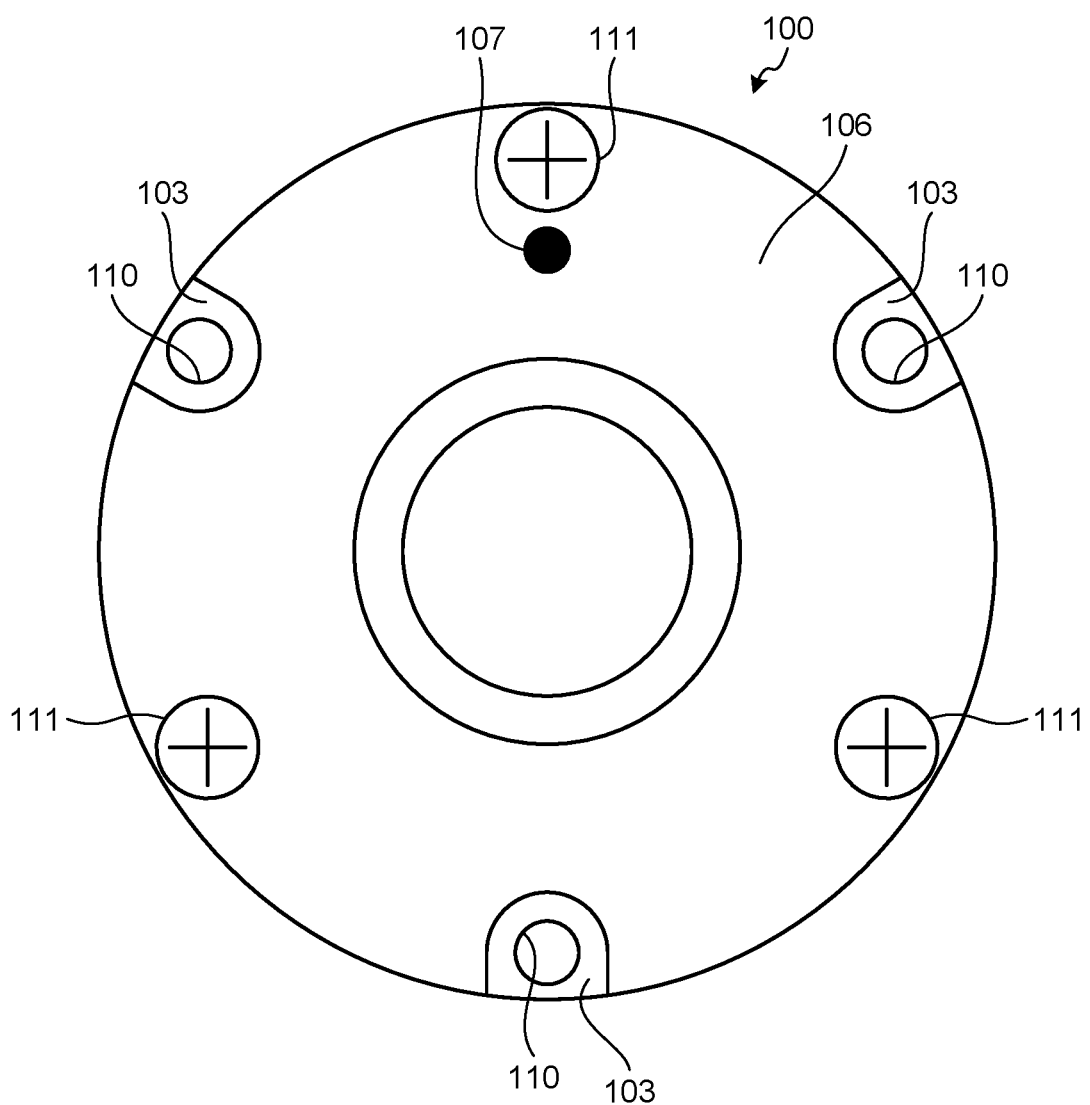
FIG. 7 is a diagram schematically illustrating the electromagnetic brake viewed in an axial direction according to the second embodiment.

As illustrated in FIG. 7, in the electromagnetic brake 100, the brake wiring 107 is taken out from one point of the fixing plate 106. In the fixing plate 106, three screws 111 are attached at positions spaced at equal intervals in the circumferential direction. The point at which the brake wiring 107 is led out from the fixing plate 106 is a position vertically above the rotation center of the wheel unit 10. In the example illustrated in FIG. 7, the brake wiring 107 is led out at the same position as one screw 111 in the circumferential direction, and is below the screw 111 in the vertical direction. The yoke 103 is provided with three bolt holes 110 at positions different from the three screws 111 in the circumferential direction. In other words, three bolt holes 110 are provided in the yoke 103 at positions spaced at equal intervals in the circumferential direction. In FIG. 7, the armature 105 and the rotary disk 101 are omitted.

In the vehicle including the in-wheel motor unit 1 configured as described above, the electromagnetic coil 102 is excited during traveling to release the electromagnetic brake 100. When the system fails, a voltage is not applied to the electromagnetic brake 100, and the system shifts to the non-excited state. Since the electromagnetic brake 100 is the non-excited operation type, the brake is operated to brake and stop the vehicle when a system failure occurs (at the time of failure). Therefore, it is possible to safely stop the vehicle.

As described above, according to the second embodiment, since the brake is configured with the electromagnetic brake 100, the space for disposing the brake can be reduced. As a result, the entire unit can be downsized.

According to the second embodiment, for example, the unit can be downsized as compared with a case where the brake is configured with the hydraulic brake. By adopting the electromagnetic brake 100, a vehicle system can be simplified as compared with the hydraulic brake or the like. An electric system is already constructed as a system for driving the motor, but a hydraulic system needs to be added separately from the electric system. This leads to an increase in cost. Therefore, according to the second embodiment, by providing the electromagnetic brake 100, an increase in cost can be suppressed.

Since the electromagnetic brake 100 is the non-excited operation type, the brake can be applied to the wheel unit 10 when there is no power supply to the electromagnetic brake 100 from the power supply device on the vehicle side. For example, when the vehicle is an electric vehicle, the rotation of the wheel unit 10 can be stopped in a state where the power supply of the vehicle is shut down. Accordingly, it is possible to keep the electric vehicle in a stopped state without requiring electric power for operating the brake.

In the second embodiment, the structure of the speed reducer 3 is not particularly limited. The speed reducer 3 according to the second embodiment may be, for example, the speed reducer 3 configured with the combined planetary gear mechanism as illustrated in FIG. 2, or may be the speed reducer 3 configured with the planetary gear mechanism as illustrated in FIG. 4.

The electromagnetic brake according to the second embodiment is not limited to the non-excited operation type, and may be an excited operation type. As a modification of the second embodiment, the in-wheel motor unit 1 can include an excitation operation type electromagnetic brake instead of the electromagnetic brake 100 of the non-excitation operation type. The excitation operation type electromagnetic brake is in an operation state of braking the rotating shaft 6 using the magnetic attraction force generated by energization, and is in a release state of rotatably releasing the rotating shaft 6 in a state of not being energized. The excitation operation type electromagnetic brake is a normally-open brake. In the vehicle equipped with the in-wheel motor unit 1 according to the modification, the electromagnetic brake can be released without exciting the electromagnetic coil during traveling. When the brake is required, the electromagnetic coil can be excited to operate the electromagnetic brake. As a result, electric power for releasing the brake during traveling becomes unnecessary, and energy consumption can be reduced. In addition, the rotary disk is rotatably released by the force of the spring (biasing force acting in the release direction).

Third Embodiment

Figure 8:
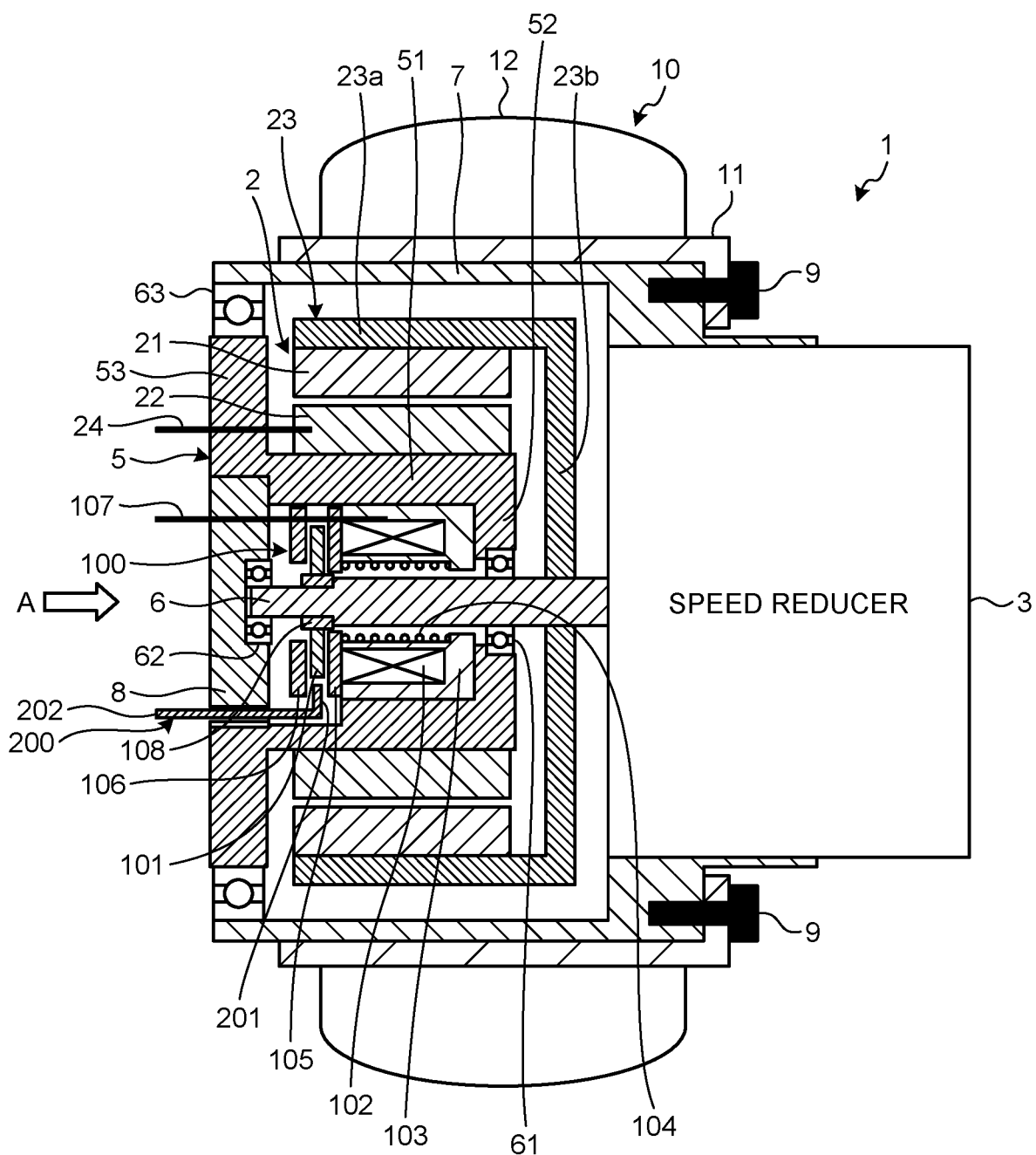
FIG. 8 is a diagram schematically illustrating an in-wheel motor unit according to a third embodiment.

FIG. 8 is a diagram schematically illustrating an in-wheel motor unit according to a third embodiment. In the third embodiment, in addition to the second embodiment, a manual releasing mechanism 200 capable of manually releasing the operation state of the electromagnetic brake 100 is provided. In the description of the third embodiment, components same as those of the second embodiment will not be described, and the same reference signs thereof will be given.

The in-wheel motor unit 1 according to the third embodiment includes a manual releasing mechanism 200 capable of manually releasing the operation state of the electromagnetic brake 100.

The manual releasing mechanism 200 includes a movable portion 201 and an operating portion 202.

The movable portion 201 is a portion that comes into contact with the armature 105. The movable portion 201 is located in a space partitioned by the housing 5 and the cover 8, and is disposed between the armature 105 and the fixing plate 106. The movable portion 201 includes a first portion disposed radially outside the fixing plate 106 and a second portion extending radially inward from the first portion and disposed at a position facing the armature 105. The first portion comes into contact with the armature 105 to press the armature 105 in the release direction at the time of manual release. The second portion supports the first portion that presses the armature 105.

The operating portion 202 is connected to the movable portion 201 and is located outside the brake chamber. The operating portion 202 is a portion that receives a releasing operation outside the cover 8, and extends so as to protrude to the outside of the cover 8. The operating portion 202 includes, for example, an operation lever, and is configured to be operated by human force from outside the vehicle.

Then, when the operating portion 202 is operated, the movable portion 201 moves according to the operation. When the operating portion 202 is operated to manually release the operation state of the electromagnetic brake 100, the movable portion 201 applies a force in the release direction to the armature 105 against the biasing force of the spring 104. Since the electromagnetic brake 100 is connected to the wheel unit 10 via the speed reducer 3, the torque required by the brake can be reduced to reduce the size. As a result, a required spring load can be reduced. In other words, the force required by the manual releasing mechanism 200 at the time of releasing can be reduced. The movable portion 201 moves the armature 105 in the engagement direction to rotatably release the rotary disk 101, so that the electromagnetic brake 100 in the operation state is released.

Regarding the positional relationship between the manual releasing mechanism 200 and the brake wiring 107, the manual releasing mechanism 200 is disposed below the brake wiring 107 in the vertical direction outside the cover 8. As illustrated in FIG. 9, when the wheel unit 10 and the in-wheel motor unit 1 are viewed in the axial direction, the manual releasing mechanism 200 is disposed below the brake wiring 107. The wheel unit 10 is rotatably supported with respect to a vehicle frame 301. The controller 302 that controls the motor 2 and the electromagnetic brake 100 is mounted on the vehicle frame 301.

Figure 10:
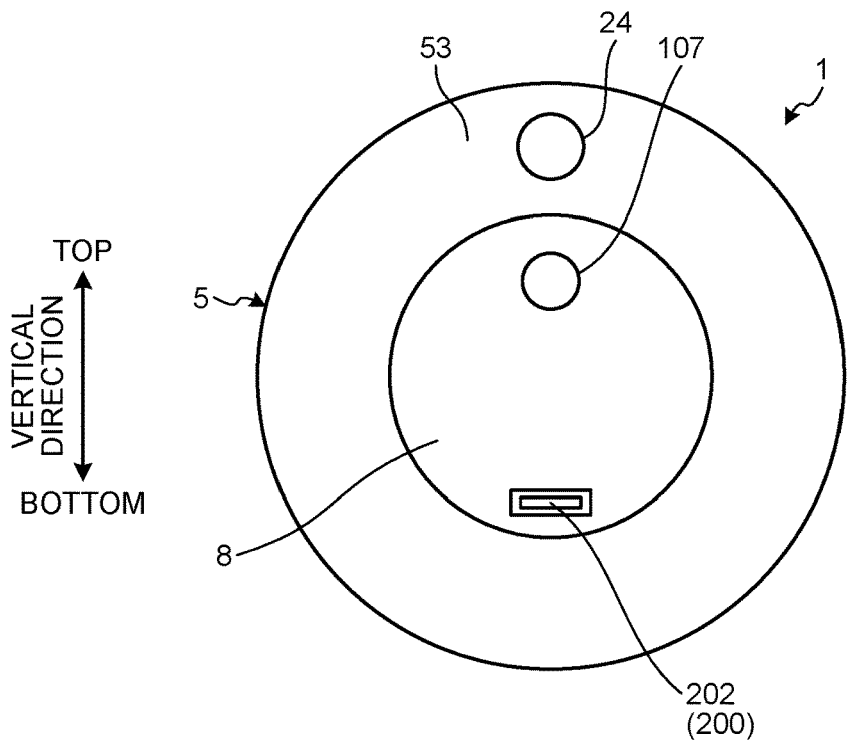
FIG. 10 is a diagram schematically illustrating a view from arrow A in FIG. 8.

Motor wiring 24 is disposed above the brake wiring 107. The motor wiring 24 is a wiring connected to the stator 22, and is electrically connected to the power supply device mounted on the vehicle. In the in-wheel motor unit 1, as illustrated in FIGS. 9 and 10, the motor wiring 24, the brake wiring 107, and the manual releasing mechanism 200 are arranged in this order from the upper side to the lower side in the vertical direction.

As described above, according to the third embodiment, the manual releasing mechanism 200 capable of releasing the operation state of the electromagnetic brake 100 of the non-excited operation type is provided, so that the electromagnetic brake 100 can be manually released even when the power supply from the power supply device is stopped.

For example, when the electric power of the power supply device is exhausted, the brake is operated to brake the wheel unit 10 in the electromagnetic brake 100 of the non-excited operation type because the power is not supplied. In order to transport the vehicle in this braking state, it is necessary to lift and move the vehicle. On the other hand, in the third embodiment, since the brake can be released by the manual releasing mechanism 200 in the non-excited state, the vehicle can be transported by rolling the wheel unit 10.

Further, according to the in-wheel motor unit 1, the operability of the operating portion 202 of the manual releasing mechanism 200 is improved. Since the vehicle body is mounted on the upper side of the in-wheel motor unit 1, it is necessary to consider this structure from the viewpoint of improving the operability at releasing the brake by the manual releasing mechanism 200. Furthermore, it is also necessary to consider the brake wiring 107 and the motor wiring 24. In consideration of these points, the manual releasing mechanism 200 is disposed below the brake wiring 107 and the motor wiring 24. When the brake wiring 107 and the motor wiring 24 are arranged below the manual releasing mechanism 200, it becomes difficult to operate the operating portion 202 of the manual releasing mechanism 200. For example, when the vehicle is a carriage, it is difficult to approach the operating portion 202 from the upper side of the carriage. Therefore, the operability is improved by disposing the operating portion 202 below the brake wiring 107 and the motor wiring 24. In other words, it is not particularly limited whether the vehicle provided with the in-wheel motor unit 1 is a vehicle on which a person can ride, a vehicle that travels in an unmanned manner, or an unmanned carriage that transports a cargo. Further, the present disclosure is not limited to a four-wheeled vehicle.

In addition, by routing the motor wiring 24 and the brake wiring 107 at a position relatively away from the ground 400, it is possible to reduce a risk of disconnection of the wirings. Furthermore, wiring can be easily routed. This is because the motor wiring 24 and the brake wiring 107 are provided above the in-wheel motor unit 1.

Figure 11:
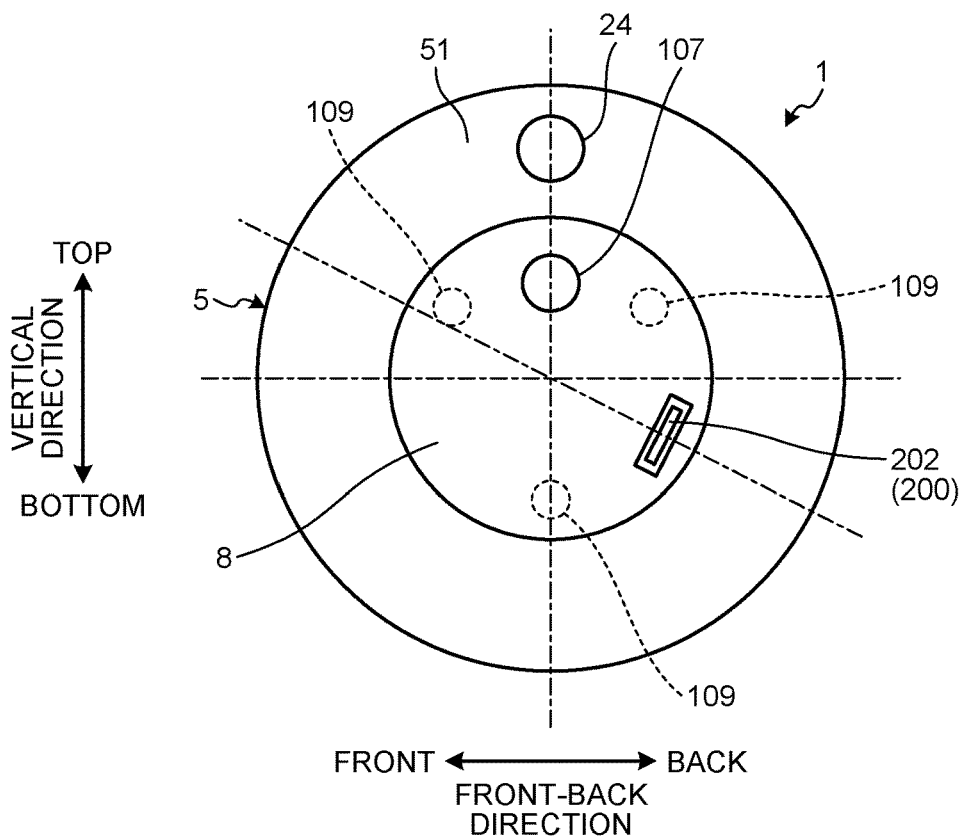
FIG. 11 is a diagram schematically illustrating a modification according to the third embodiment.

As a modification of the third embodiment, a position where the operating portion 202 protrudes outside the cover 8 can be changed. For example, as illustrated in FIG. 11, the operating portion 202 can be disposed at a position inclined from the vertical direction. At the position inclined from the vertical direction, an inclination angle is obtained by "{(360 degrees)/(the number of bolts 109 for fixing the brake)}/2". In this modification, a circumferential position of the operating portion 202 can be determined according to the number of bolts 109 and arrangement of the bolts 109 for fixing the electromagnetic brake 100. Note that FIG. 11 illustrates a case where the in-wheel motor unit 1 is viewed from the inner side of the vehicle.

Specifically, in the example illustrated in FIG. 11, since the number of bolts 109 for fixing the brake is three, the inclination angle from the vertical direction is "{(360 degrees)/3}/2=60 degrees". Therefore, the circumferential position (phase) with the upper side in the vertical direction as a start point (0 degrees) is 120 degrees or 240 degrees. Since the lower side in the vertical direction is a circumferential position at 180 degrees, positions at 120 degrees and 240 degrees are determined as positions inclined in the circumferential direction for an inclination angle of 60 degrees from the position at 180 degrees. Therefore, the operating portion 202 of the manual releasing mechanism 200 is disposed at these circumferential positions.

In this case, whether the wheel unit 10 is a rear wheel or a front wheel is considered. In order to facilitate the approach to the operating portion 202, when the wheel unit 10 is the rear wheel, the operating portion 202 is disposed at a position inclined to the back side of the vehicle from the vertical direction, and when the wheel unit 10 is the front wheel, the operating portion 202 is disposed at a position inclined to the vehicle front side with respect to the vertical direction. In addition, the inclination direction with respect to the vertical direction changes depending on whether the wheel unit 10 is a left wheel or a right wheel.

Figure 12:
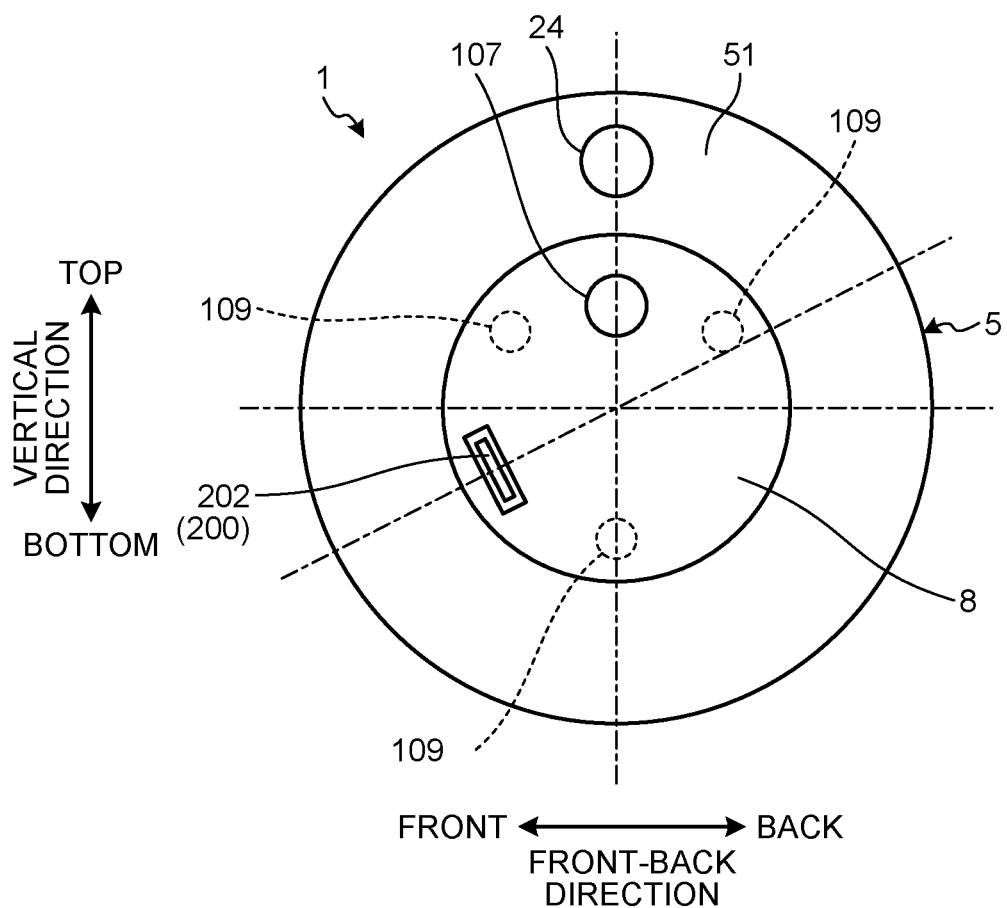
FIG. 12 is a diagram illustrating the modification according to the third embodiment.

For example, when the wheel unit 10 is a right rear wheel, as illustrated in FIG. 11, the manual releasing mechanism 200 is disposed at a position at 120 degrees starting from the upper side in the vertical direction. As a result, the operating portion 202 of the right rear wheel is disposed on the back side of the vehicle. When the wheel unit 10 is a left rear wheel, as illustrated in FIG. 12, the manual releasing mechanism 200 is disposed at a position at 240 degrees starting from the upper side in the vertical direction. As a result, the operating portion 202 of the left rear wheel is disposed on the back side of the vehicle.

According to this modification, it is possible to improve the reliability of the in-wheel motor unit 1 and reduce the cost by sharing the components. In the manual releasing mechanism 200, a foreign substance such as water remains on the operating portion 202. When the manual releasing mechanism 200 is turned on or off, there is a possibility that the foreign substance enters the unit. Since the manual releasing mechanism 200 is disposed at a position inclined for a predetermined angle from the vertically downward position, it has a structure in which water or the like is less likely to be accumulated. Further, by determining the installation angle (phase) of the manual releasing mechanism 200 based on the number of bolts 109 fixing the electromagnetic brake 100 and the housing 5, the electromagnetic brake 100 in common can be used, and thus the cost can be reduced.

FIGS. 11 and 12 illustrate the example when the wheel unit 10 is the rear wheel. When the wheel unit 10 is the front wheel, the operating portion 202 of the manual releasing mechanism 200 can be disposed at a position inclined from the lower side in the vertical direction to the vehicle front side. Therefore, when the wheel unit 10 is a right front wheel, the manual releasing mechanism 200 is disposed at a position at 240 degrees starting from the upper side in the vertical direction. When the wheel unit 10 is a left front wheel, the manual releasing mechanism 200 is disposed at a position at 120 degrees starting from the upper side in the vertical direction.

Further, the number of bolts 109 is not limited to three. The number of bolts 109 may be three or more. For example, when the number of bolts 109 is four, the inclination angle from the vertical direction is 45 degrees, and thus the operating portion 202 of the manual releasing mechanism 200 is disposed in a phase at 135 degrees or 225 degrees.

In the present disclosure, in the in-wheel motor including the motor in which the rotor is disposed on the radially outer side of the stator, the axial dimension of the unit can be reduced by disposing the brake on the radially inner side of the stator. In addition, by fixing the stator and a fixing portion of the brake onto a common housing, only one housing is necessary, and the number of housings can be reduced. This makes it possible to downsize the entire unit while securing mounting flexibility.

According to an embodiment, in the in-wheel motor including the motor in which the rotor is disposed on a radially outer side of the stator, an axial dimension of the unit can be reduced by disposing the brake on a radially inner side of the stator. In addition, by fixing the stator and a fixing portion of the brake onto a common housing, only one housing is necessary, and the number of housings can be reduced. This makes it possible to downsize the entire unit while securing mounting flexibility.

According to an embodiment, the axial dimension can be reduced by disposing a speed reducer in the wheel. Further, since the brake is connected to a wheel unit via the speed reducer, a torque required by the brake can be reduced, and the brake can be downsized. As a result, the entire unit can be downsized.

According to an embodiment, even when there is no power supply to a non-excited operation type electromagnetic brake, an operation state of the brake can be manually released by a manual releasing mechanism. As a result, the wheel unit in the non-excited state can be brought into a rotatable state.

According to an embodiment, operability of an operating portion can be secured by disposing the operating portion of the manual releasing mechanism on a lower side of wiring of the motor and wiring of the electromagnetic brake. In addition, since the wiring of the motor and the wiring of the electromagnetic brake are disposed at positions relatively away from the ground, it is possible to reduce a risk of disconnection of these wirings.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An in-wheel motor unit provided in a wheel of a wheel unit, the in-wheel motor unit comprising:
   a motor having a rotor disposed on a radially outer side of a stator;
   a brake disposed on an inner side of the motor;
   a manual releasing mechanism that manually releases an operation state of the brake; and
   a housing that accommodates the motor and the brake, wherein
   the housing has a cylindrical partition that radially partitions a space for accommodating the motor and a space for accommodating the brake,
   the stator is fixed to an outer peripheral surface of the partition,
   the brake is disposed on an inner peripheral side of the partition, and a fixing portion included in the brake is fixed to the housing,
   the brake is an electromagnetic brake of a non-excited operation type,
   the manual releasing mechanism that applies a force in a release direction to an armature of the electromagnetic brake in a state that the electromagnetic brake is not energized,
   the motor has wiring led out to an outside of the housing in an axial direction,
   the electromagnetic brake has wiring led out to the outside of the housing in the axial direction,
   the manual releasing mechanism includes:
      a movable portion that moves so as to apply the force in the release direction to the armature inside the housing; and
      an operating portion that is connected to the movable portion and extended outward in the axial direction from the housing, the operating portion receiving a releasing operation of applying the force in the release direction to the armature, and
   the operating portion is disposed on a lower side, in a vertical direction, of the wiring of the motor and the wiring of the electromagnetic brake outside the housing.

2. The in-wheel motor unit according to claim 1, further comprising
   a speed reducer provided in a power transmission path between the motor and the wheel unit, the speed reducer decelerating a rotation of the rotor and outputting the rotation decelerated to the wheel unit, wherein
   the brake applies a braking force to the wheel unit via the speed reducer, and
   the speed reducer is disposed side by side with the motor in an axial direction, and at least a part of the speed reducer is disposed inside the wheel.

* * * * *